May 24, 1966  J. B. SMITH  3,252,192
CLAMP RING FOR PIPE AND THE LIKE
Filed April 1, 1964

INVENTOR.
JOSEPH B. SMITH
BY
RICHEY, MCNENNY & FARRINGTON
Donald W. Farrington
ATTORNEYS

United States Patent Office 3,252,192
Patented May 24, 1966

3,252,192
CLAMP RING FOR PIPE AND THE LIKE
Joseph B. Smith, 5350 W. 130th St., Cleveland 30, Ohio
Filed Apr. 1, 1964, Ser. No. 356,569
4 Claims. (Cl. 24—81)

This invention relates generally to clamping devices and more particularly to a pipe clamping device suitable for holding adjacent ends of pipes in a fixed position relative to each other.

A preferred embodiment of this invention is illustrated in an apparatus arranged for clamping adjacent large diameter pipes and holding the adjacent ends in a fixed position relative to each other. Normally, the apparatus is used to hold adjacent ends of pipe which are connected by suitable coupling devices. It not only positions the ends but operates to carry the separating forces created by pressure contained within the connected pipes.

The clamping device provides a strong grip without any appreciable distortion of the pipe even when relatively thin walled large diameter pipes are being gripped. The particular clamping device illustrated is sized to clamp an eighteen inch pipe line, however, it should be understood that both larger and smaller diameter pipes can be satisfactorily clamped with a properly sized clamping apparatus incorporating this invention.

In one form of prior clamping apparatus a plurality of set screw type elements are mounted around the pipe in a clamping ring and are threaded into engagement with the wall of the pipe to provide the gripping. In such devices difficulty is often encountered since the amount of gripping provided by each set screw element is limited when the set screw is not threaded against the pipe with sufficient force to provide substantial distortion or damage to the pipe wall. Therefore, set screw type clamping devices have been found to be unsatisfactory for certain pipe sizes and wall thicknesses, particularly on high pressure pipe lines.

With a clamping apparatus incorporating this invention the gripping of the pipe wall is provided over a substantial area and is evenly applied to the wall so that distortion or damage of the pipe wall does not occur. The clamping apparatus is provided with a layer of relatively hard and relatively small particles along the gripping surface which are embedded in an adhesive. When the clamping apparatus is installed on a pipe these particles partially embed into the surface of both the pipe and the gripping surface providing small indentations each of which produces a locking action which supplements the locking action of the other particles to provide extremely high gripping capacity. However, the small indentations in the pipe wall do not damage the wall nor do they produce any appreciable distortion which could interfere with the pipe use.

It is an important object of this invention to provide a novel and improved clamping apparatus particularly suitable for supporting high loads.

It is another object of this invention to provide a novel and improved clamping device having a gripping surface with a layer of small hard particles thereon operable to embed into the surface being gripped and thereby produce a high gripping capacity.

It is another important object of this invention to provide a novel and improved pipe clamp having a gripping surface and a layer of small hard particles adhesively retained on the gripping surface.

It is another important object of this invention to provide a novel and improved pipe clamp including a pair of spaced clamping rings each providing internal gripping surfaces on which a layer of small hard particles are adhesively retained wherein each ring uniformly grips the pipe surface over a substantial area without causing damage to the pipe wall or collapsing thereof in combination with means to fix the two clamp rings in a predetermined space relationship so that two pipes may be connected and supported against axial loads.

It is still another object of this invention to provide a novel and improved pipe clamping ring having similar and opposed gripping surfaces each provided with a layer of small particles having a hardness substantially higher than the pipe and ring, adhesively secured to the gripping surfaces in combination with means to urge the gripping surfaces toward each other to produce gripping of the pipe wall.

Other objects and advantages will appear from the following descriptions and drawings, wherein.

The illustrated apparatus is often used in the repair of pipe lines which are damaged while in use. The clamping apparatus rigidly positions the pipe ends while a sealing ring prevents leakage. In some instances the clamping apparatus is only used to temporarily support the pipes during installation of the sealing rings which are then welded to the pipes so that the ring will support the load. In such instances the clamping apparatus is usually removed after such welding, however, in other instances welding is difficult or impractical and the clamping device remains permanently in use.

The gripping is evenly distributed over a relatively large area so substantially any axial force can be supported, even on thin walled pipe, without destructive load concentrations on the pipe wall at any point along the clamping surface.

Figure 1:
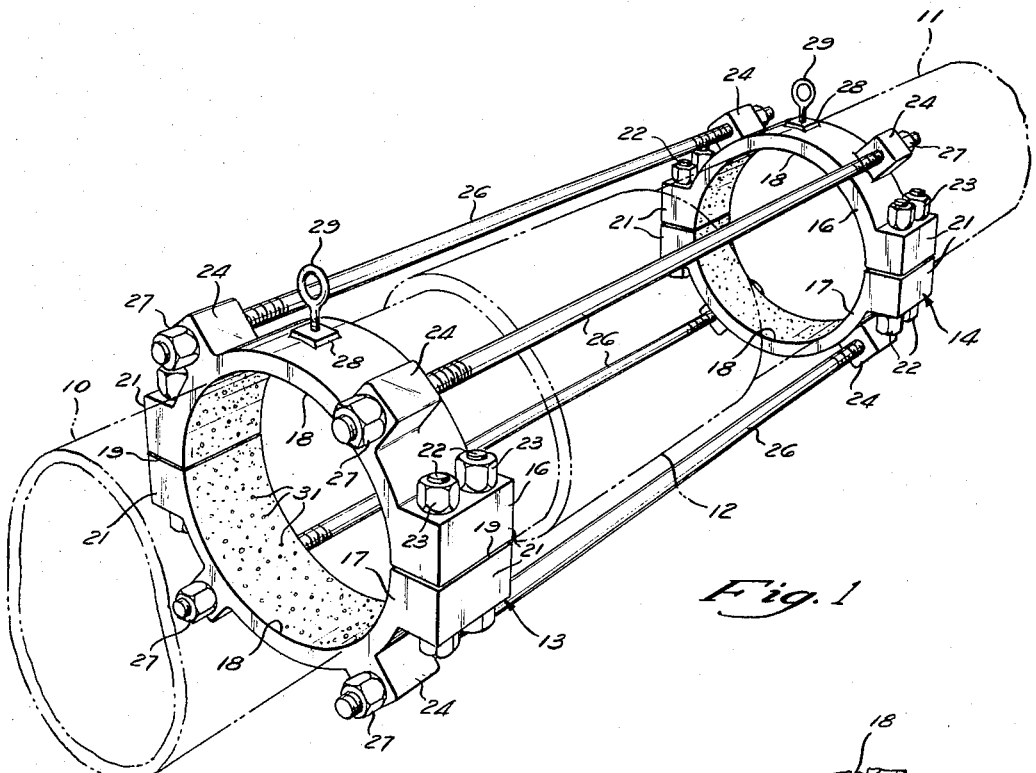
FIGURE 1 is a perspective view of an assembled pipe clamp incorporating this invention, illustrating how it may be used to connect and support adjacent ends of two pipes which are sealed by a sealing ring. The pipes and sealing ring are schematically illustrated in phantom.

Referring to FIGURE 1, the clamping device is used to connect two pipe sections 10 and 11 which extend into opposite ends of a suitable sealing pipe coupling 12. The particular sealing coupling structure forms no part of this invention so it has been illustrated in phantom. One suitable structure is illustrated in my United States Patent, No. 2,647,769, dated August 4, 1953.

The clamping apparatus includes two ring assemblies 13 and 14, one of which is installed on each of the pipes 10 and 11. Each of these ring assemblies has the same structure and includes two opposed curved clamp members 16 and 17 which are also identical. Each of the clamp members is formed with a semi-cylindrical inner gripping surface 18 having a radius of curvature about 1/16 of an inch larger than the radius of curvature of the pipe with which the clamp member is to be used. Each end of the inner surface 18 terminates at an end wall 19 of clamping flanges 21 formed on opposite sides of each clamp member. The clamp members are proportioned so that the end walls 19 will normally be spaced apart about 1/4 of an inch when the clamp members are installed on the pipes 10 or 11. This spacing provides for variations in pipe diameter within the range of tolerances thereof and insures that the full clamping force is applied to the pipe.

A pair of clamping bolts 22 extends through each pair of the flanges and in cooperation with nuts 23 threaded thereon connect to the two clamp members pressing them together to produce the gripping force. Each of the clamping members 16 and 17 is also provided with a pair of lugs 24 symmetrically positioned around the pipe when the rings are installed. A tie bolt 26 extends through corresponding lugs 24 of each of the ring assemblies 13 and 14 and cooperates with nuts 27 threaded thereon to connect the ring assemblies. This structure provides symmetrical support of axial loads on the pipes 10 and 11 and permits accurate and adjustable positioning of the pipe ends. Each of the clamp members is also formed with a lug 28 having a threaded hole therein which may be used for a support eye 29, as illustrated in FIGURE 1.

A layer of lump-like particles 31 are secured to the gripping surface 18 of each clamp member by an adhesive 32. In one practical form of this invention, which has been found to be very satisfactory in use, a coating of epoxy adhesive manufactured by the Pittsburgh Glass Company and designated as formula 666 is applied to the surfaces 18 to a thickness of about $\frac{1}{32}$ of an inch. Most other good waterproof adhesive, however, will be satisfactory. The particles 31 are then deposited on the adhesive to form an even layer of particles along the entire surfaces 18. Very satisfactory results have been provided when the particles are generally spherical steel shot which have a size range from about twenty-five thousandths of an inch to fifty thousandths of an inch and a hardness of about Rockwell C–50 to C–60.

Figure 3:
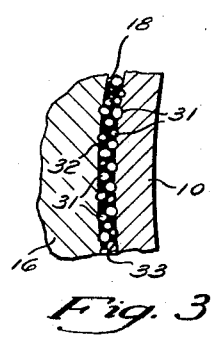
FIGURE 3 is an enlarged fragmentary section illustrating the gripping particles adhesively secured to the gripping surface of the clamping rings and their action in gripping the wall of the pipe.
Figure 2:
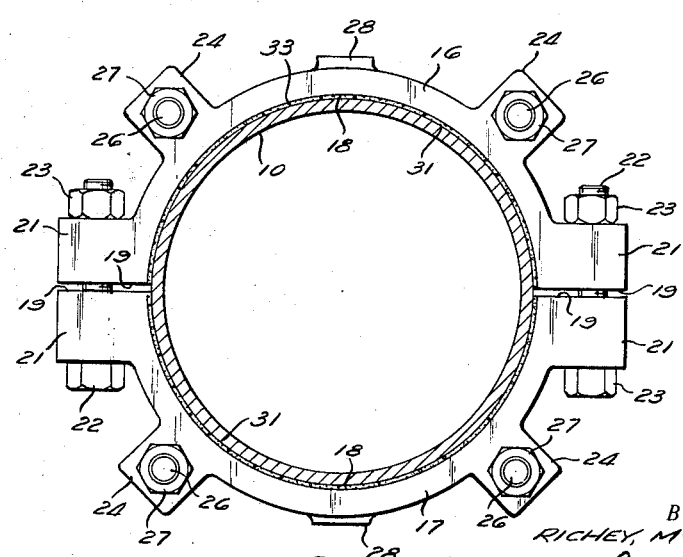
FIGURE 2 is an end view of one of the clamping rings.

The layer of particles are applied to a thickness of about $\frac{1}{16}$ of an inch and embedded into the adhesive, as illustrated in FIGURE 3. This specific clamp assembly described is used on pipes having a Rockwell hardness of about B–90, therefore, the shot are substantially harder than the pipe wall. The particular hardness ratio is not particularly critical providing the shot is substantially harder than the pipe wall so that it will embed into the surface 33 of the wall of the pipe, as illustrated in FIGURE 3. The shot used is also substantially harder than the metal of the members 16 and 17 so they also embed into the surfaces 18. The shot 13 is sufficiently ductile to prevent any substantial chipping or breaking thereof.

The very small penetrations of the shot particles into the surface of the pipe wall do not produce any serious weakening of the wall and do not tend to produce collapsing of the pipe since the penetrations are extremely small and the forces are uniformly applied around the entire circumference of the pipe. This uniform application of pressure permits extremely high clamping forces without producing any collapsing of the pipe wall.

Since the particles indent into the surfaces 33 of the wall and 18 of the clamp ring, the shot do not roll and any tendency to slip under the influence of supported loads causes the particles to tilt and pile up producing additional embedment. Preferably, the layer of shot has a thickness less than twice the size of the larger particles so that slip planes do not occur.

During the installation of the clamping rings any variations in the thickness of the layer of particles from one point to another will produce slight movements in the particles within the adhesive resulting in a uniform layer and a uniform application of force. Such slight movements normally occur before particles embed into the surfaces.

Since the gripping of each particle adds to the gripping of other particles the total axial force which can be resisted by the clamping apparatus is a function of the number of particles per unit area times the area of the gripping surfaces. If higher gripping forces are required it is merely necessary to increase the gripping area by lengthening the member 16 and 17 along the axis of the pipe.

Although a preferred embodiment of this invention is illustrated, it is to be understood that various modifications and rearrangements of parts may be resorted to without departing from the scope of the invention as defined in the following claims.

What is claimed is:
1. A clamp for gripping a tubular article having a cylindrical surface comprising a pair of opposed and similar members each formed with a semi-cylindrical gripping surface, a pressure flowable adhesive coating on each gripping surface, a layer of relatively closely packed generally spherical ductile particles secured to said members by said adhesive, said layer of particles having a substantially uniform thickness of less than about twice the diameter of said particles and more than the diameter of any single particle, a majority of said particles being within a size range of about twenty-five thousandths and about fifty thousandths of an inch in diameter, the radius of curvature of said gripping surfaces being substantially equal to the radius of curvature of said cylindrical surface plus the thickness of said layer, and tightening means associated with said members to press said gripping surfaces tightly against an encircled cylindrical surface, said adhesive coating permitting relative movement between said particles to insure substantially uniform gripping of said cylindrical surface.

2. A clamp for gripping a tubular article having a cylindrical surface comprising a pair of opposed and similar members each formed wtih a semi-cylindrical gripping surface, a pressure flowable adhesive coating on each gripping surface, a layer of relatively closely packed lump-like ductile particles secured to said members by said adhesive, said particles having a hardness greater than the hardness of said cylindrical surface and said gripping surface, said layer of particles having a substantially uniform thickness of less than about twice the major dimension of said particles and more than the major dimension of any single particle, a majority of said particles being within a size range of about twenty-five thousandths to about fifty thousandths of an inch in diameter, the radius of curvature of said gripping surfaces being substantially equal to the radius of curvature of said cylindrical surface plus the thickness of said layer, and tightening means associated with said members to press said gripping surfaces tightly against an encircled cylindrical surface, said adhesive coating permitting relative movement between said particles to insure substantially uniform gripping of said cylindrical surface.

3. A clamp for gripping a tubular article having a cylindrical surface comprising a plurality of members each formed with a gripping surface cooperating with a gripping surface of the other of said members to define a cylindrical gripping surface, a pressure flowable adhesive coating on each gripping surface, a layer of relatively closely packed lump-like ductile particles secured to said members by said adhesive, said particles having a hardness substantially greater than the hardness of said cylindrical surface and said gripping surface, said layer of particles having a substantially uniform thickness of less than about twice the maximum dimension of said particles and more than the maximum dimension of any single particle, the majority of said particles being within a size range of about twenty-five thousandths to about fifty thousandths of an inch, the radius of curvature of said gripping surfaces being substantially equal to the radius of curvature of said cylindrical surface plus the thickness of said layer, and tightening means associated wtih said members operable to press said gripping surfaces tightly against an encircled cylindrical surface, said adhesive coating permitting relative movement between said particles to insure substantially uniform gripping of said cylindrical surface.

4. A clamp for gripping a tubular article having a cylindrical surface comprising a pair of clamping assemblies adapted to be mounted at spaced points along said tubular article, tension means extending between said assemblies adapted to urge said assemblies toward each other; each assembly including a plurality of members each formed with a gripping surface cooperating with a gripping surface of the other of said members to define a cylindrical gripping surface, a pressure flowable adhesive coating on each gripping surface, a layer of relatively closely packed lump-like ductile particles secured to said members by said adhesive, said particles having a hardness substantially greater than the hardness of said cylindrical surface and said gripping surface, said layer of particles having a substantially uniform thickness, of less than about twice the maximum dimension of said particles and more than the maximum dimension of any single particle, the majority of said particles being within a size range of about twenty-five thousandths to about fifty thousandths of an inch, the radius of curvature of said gripping surfaces being substantially equal to the radius of curvature of said cylindrical surface plus the thickness of said layer, and tightening means associated with said members operable to press said gripping surfaces tightly against an encircled cylindrical surface, said adhesive coating permitting relative movement between said particles to insure substantially uniform gripping of said cylindrical surface.

References Cited by the Examiner

UNITED STATES PATENTS

| | | |
|---|---|---|
| 307,648 | 11/1884 | Holland et al. _____ 285—420 |
| 2,230,287 | 2/1941 | Curtis _____ 138—99 |
| 2,596,772 | 5/1952 | Hawkes. |
| 2,719,025 | 9/1955 | Stone. |
| 3,096,554 | 7/1963 | Johnson. |
| 3,141,688 | 7/1964 | Taylor et al. _____ 24—279 X |

WILLIAM FELDMAN, *Primary Examiner.*

D. GRIFFIN, *Assistant Examiner.*